US011814993B2

(12) United States Patent
Rosengren

(10) Patent No.: US 11,814,993 B2
(45) Date of Patent: Nov. 14, 2023

(54) METHOD AND SYSTEM FOR CHECKING AN OIL LEVEL IN A MARINE DRIVE UNIT

(71) Applicant: VOLVO PENTA CORPORATION, Gothenburg (SE)

(72) Inventor: Christofer Rosengren, Gothenburg (SE)

(73) Assignee: VOLVO PENTA CORPORATION, Gothenburg (SE)

( * ) Notice: Subject to any disclaimer, the term of this patent is extended or adjusted under 35 U.S.C. 154(b) by 53 days.

(21) Appl. No.: 17/649,735

(22) Filed: Feb. 2, 2022

(65) Prior Publication Data
US 2022/0251984 A1  Aug. 11, 2022

(30) Foreign Application Priority Data
Feb. 9, 2021  (EP) ..................................... 21156088

(51) Int. Cl.
*F01M 11/12* (2006.01)
*G01F 23/00* (2022.01)
*B63H 20/00* (2006.01)

(52) U.S. Cl.
CPC .......... *F01M 11/12* (2013.01); *G01F 23/0007* (2013.01); *B63H 20/002* (2013.01)

(58) Field of Classification Search
CPC .... F01M 11/12; G01F 23/0007; B63H 20/002
See application file for complete search history.

(56) References Cited

U.S. PATENT DOCUMENTS

| 2,624,790 | A | * | 1/1953 | Drace | ................ G01F 23/0007 73/290 R |
| 4,971,532 | A | * | 11/1990 | Slattery | ..................... F04B 7/06 184/33 |
| 5,076,397 | A | * | 12/1991 | Yamada | ................... F01M 1/26 356/70 |
| 5,149,287 | A |  | 9/1992 | Koike | |
| 8,657,638 | B1 | * | 2/2014 | Gonring | ............... B63H 20/002 440/88 L |
| 8,746,410 | B1 | * | 6/2014 | Lekowicz | ........... F16H 57/0447 184/6 |
| 9,193,429 | B1 |  | 11/2015 | Langenfeld | |

(Continued)

OTHER PUBLICATIONS

European Search Report dated Jul. 28, 2021 in corresponding European Patent Application No. 21156088.3, 6 pages.

*Primary Examiner* — Kurt Philip Liethen
(74) *Attorney, Agent, or Firm* — Venable LLP; Jeffri A. Kaminski

(57) ABSTRACT

A method for checking the oil level in a marine drive unit, where the drive unit is provided with an external oil filter, an oil level sensor adapted to determine an oil level in the drive unit, and an electronically controlled tilt means, comprising the steps of, initiating an oil level check, controlling the tilt means to tilt the drive unit to a plurality of different tilt angle positions, for each tilt angle position, determining if the oil level sensor detects the oil level in the drive unit, for each tilt angle position, registering the tilt angle of the drive unit and the signal from the oil level sensor, determining at which tilt angles the sensor detects the oil level, and in dependence of the determined tilt angle of the drive unit, determining if the oil level of the drive unit is within a predefined range.

14 Claims, 5 Drawing Sheets

(56) References Cited

U.S. PATENT DOCUMENTS

| | | | |
|---|---|---|---|
| 9,587,534 B2* | 3/2017 | Bradford | G01F 23/268 |
| 10,494,967 B1 | 12/2019 | Osthelder et al. | |
| 11,519,327 B1* | 12/2022 | Lemancik | B63H 20/32 |
| 2005/0118900 A1 | 6/2005 | Takahashi et al. | |
| 2011/0144851 A1* | 6/2011 | Gremminger | G01N 33/2888 |
| | | | 701/31.4 |
| 2015/0362350 A1* | 12/2015 | Miller | G01F 23/0007 |
| | | | 73/290 R |
| 2016/0230625 A1* | 8/2016 | Bradford | G01F 23/268 |

* cited by examiner

METHOD AND SYSTEM FOR CHECKING AN OIL LEVEL IN A MARINE DRIVE UNIT

TECHNICAL FIELD

The present invention relates to a method and a system for checking an oil level in a marine drive unit provided with an external oil filter. The method may be used to determine if the amount of oil in the drive unit is within a predefined range or not.

BACKGROUND ART

Marine drive units, such as outboard engines or sterndrives, are provided with a transmission that transfer power from the engine of a boat to the propeller. The transmission contains oil that lubricates the rotating parts in the transmission. It is important that there is enough oil in the transmission, such that the transmission is sufficiently lubricated. It is however also important that there is not an excessive amount of oil, which will increase energy losses in the transmission. This may also increase the oil temperature, which may degrade the oil.

In order to ensure that the amount of oil is correct, the oil reservoir may be provided with an oil level sensor. The oil level sensor may be a sensor that can measure the oil level continuously, or may be a low oil level sensor that detects if the oil level is too low. Other sensors, such as oil quality sensors that measures different parameters of the oil can also be used to detect the oil level in the oil reservoir.

Normally, these different oil level sensors functions perfectly well. This is the case for outboard engines or most sterndrives where the complete amount of oil is held in the internal oil reservoir. In some cases, where the sterndrive is provided with an external oil filter positioned in the boat, apart from the sterndrive, it is more difficult to determine if the correct amount of oil is used in the system.

One reason to use an external oil filter is to be able to change the oil and the oil filter without lifting the boat. This will in turn make it difficult to determine if the correct amount of oil is refilled into the sterndrive.

There is thus a need for an improved method to check the oil level in a marine drive unit provided with an external oil filter.

DISCLOSURE OF INVENTION

An object of the invention is therefore to provide an improved method to check the oil level in a marine drive unit. A further object of the invention is to provide a system for checking the oil level in a marine drive unit. A further object of the invention is to provide a boat comprising such a system. An object is also to provide a computer program and a computer program product adapted to perform the steps of the method.

The solution to the problem according to the invention is described in the characterizing part of claim 1 regarding the method, in claim 11 regarding the system and in claim 12 regarding the boat. The other claims contain advantageous further developments of the inventive method. Claims for a computer program and a computer program product are also enclosed.

In a method for checking the oil level in a marine drive unit, where the drive unit is provided with an external oil filter, an oil level sensor adapted to determine an oil level in the drive unit, and an electronically controlled tilt means, the steps of; initiating an oil level check; controlling the tilt means to tilt the drive unit to a plurality of different tilt angle positions; for each tilt angle position, determining if the oil level sensor detects the oil level in the drive unit, for each tilt angle position, registering the tilt angle of the drive unit and the signal from the oil level sensor; determining at which tilt angle the sensor detects the oil level; and in dependence of the determined tilt angle of the drive unit, determining if the oil level of the drive unit is within a predefined range.

By this first embodiment of the method, the method is able to check if the oil level in a drive unit is within a predefined range or not. In this way, it can be determined if the correct amount of oil is filled in the system. This is especially advantageous in drive unit where the oil filter is positioned externally from the drive unit, and is positioned in the boat.

The advantage of positioning the oil filter outside of the drive unit, in the boat, is that an oil change and an oil filter change is simplified. In normal sterndrives and outboard engines, the oil in the transmission is changed by letting the oil out from the bottom drain hole of the transmission. The correct oil level in the transmission is obtained when oil comes out of an upper vent hole. An oil change in this way can only be performed when the boat is lifted out of the water and placed on land. The oil change interval of a normal sterndrive or outboard engine is mostly between 100 to 200 hours, which is often more than enough for a season of recreational use. However, for commercial use, where a boat may be used up to 2000 hours or more in a season or between larger service intervals, such an oil change scheme is very unpractical and time consuming and thus costly.

For commercial boats, an external oil filter is thus of advantage. In such a system, the oil filter is positioned apart from the sterndrive, in the boat and preferably in the engine compartment of the boat. In this way, the oil and the oil filter can be exchanged in an easy way without having to lift the boat out of the water. One problem with an external oil filter is that the correct oil level when refilling oil is difficult to detect, since the vent hole can not be used to set the correct oil level. The installation of the external oil system may also differ between different boat models and different engine installations, depending e.g. on other auxiliary installed equipment. This means that the specified amount of oil may differ between each installation. In a typical sterndrive, the amount of oil may e.g. be 6 litres, with a tolerance of 2-3 dl. Because of this, the regular oil level sensor in the sterndrive cannot be used to ensure that the correct amount of oil is used in the system. The regular oil level sensor is further normally not adapted to measure the amount of oil in the sterndrive, but to indicate if the oil level is too low. Such a sensor can thus not indicate if the oil level is correct, or if the oil level is too high.

The inventive method can be used to determine if the oil level is within a predefined range, or if it is outside of the predefined range. If the oil level is outside the predefined range, the method can further be used to determine by how much the oil level differs from the correct amount of oil. If the oil level is above the predefined range, it can be determined how much oil that is to be drained from the oil system. If the oil level is below the predefined range, it can be determined how much oil that is to be filled into the oil system.

It is thus not necessary to use a separate, dedicated oil level sensor with a high resolution. By tilting the drive unit to different tilt positions, and at the same time determining if the oil level sensor detects the oil level or not, the system can determine the angle at which the oil level sensor does not detect an oil level. The tilt angle and the specific installation parameters can in this way be used to determine if the correct oil level is filled in the system, or if the amount of oil is not correct. If there is not enough oil in the system, the oil pressure in the system may not be high enough to lubricate all components, and too much oil may cause excessive friction that may lead to higher oil temperature and energy losses.

In the inventive control system for checking the oil level in a marine drive unit, where the drive unit is provided with an external oil filter, an oil level sensor adapted to determine an oil level in the drive unit, an electronically controlled tilt means, and an electronic control unit, the object of the invention is achieved in that the electronic control unit is adapted to tilt the drive unit to a predefined number of angle positions, to determine if the oil level sensor detects the oil level at each angle position, and to determine if the oil level is within a predefined range or not.

With the inventive control system, it is possible to determine if the correct amount of oil is filled into a sterndrive provided with an external oil filter. The control system is mainly intended to be used when an oil filter and/or oil is changed in the stern drive system. When the estimated amount of oil is filled into the system and the new oil filter is installed, the control system performs an oil check cycle. The oil check cycle determines if the amount of oil is within a predefined range or not.

In a development of the control system, the control system can also determine either how much excessive oil there is, or how much oil that is missing. In this way, it is easy to correct the amount of oil in the system.

BRIEF DESCRIPTION OF DRAWINGS

The invention will be described in greater detail in the following, with reference to the attached drawings, in which.

MODES FOR CARRYING OUT THE INVENTION

The embodiments of the invention with further developments described in the following are to be regarded only as examples and are in no way to limit the scope of the protection provided by the patent claims.

Figure 1:
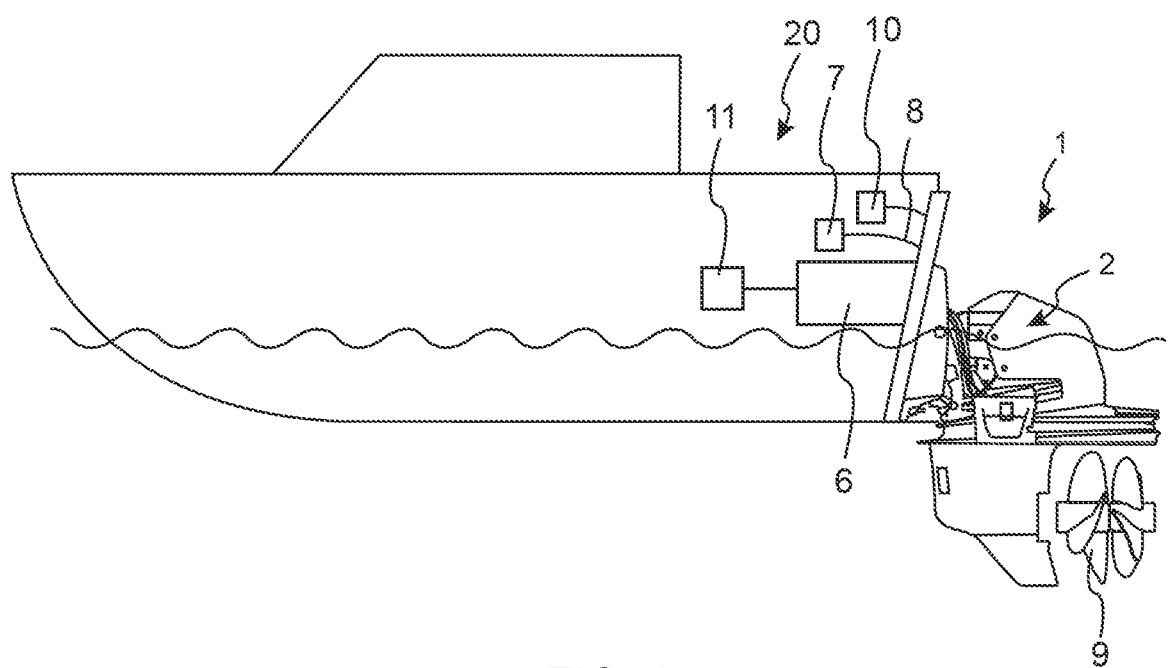
FIG. 1 shows a schematic boat provided with a sterndrive.

FIG. 1 shows a schematic boat 20 provided with an inventive control system 1 for checking an oil level 5 in a drive unit 2. The control system is suitable to be used on any type of boat or watercraft provided with one or more sterndrives. In the shown example, a boat comprising a single sterndrive will be used.

The boat 20 comprises a marine drive unit 2 in the form of a sterndrive. The boat further comprises an engine 6 or motor of some kind, adapted to power the boat. The engine may e.g. be a diesel internal combustion engine that is connected to the sterndrive. The sterndrive transfers the power of the engine to the propeller 9. The upper part of the sterndrive contains a driveshaft that is connected through a transom to the engine and transmits the engine power through a 90 degree-angle gearbox to the lower part, which contains a vertical driveshaft that transmits the power through another 90 degree-angle gearbox to the propeller shaft and the propeller. To optimize the trim of the boat, the sterndrive may be tilted during driving. The sterndrive may also be pivoted up completely for trailer travel and between uses to avoid fouling. The tilting of the sterndrive is performed with one or two tilt means 4, which are often electric or hydraulic linear cylinders. The tilt angle for a typical sterndrive may be e.g. in the range 0-50 degrees. The tilt means in the shown example comprises two hydraulic cylinders powered by a separate electric pump, which may be powered by the generator of the engine when the engine is running, or by the battery 11 when the engine is shut off. In this way, the oil level can be checked without the engine running. The tilt means are also provided with a tilt angle sensor that outputs a signal that is proportional to the actual tilt angle. In this way, the actual tilt angle can be measured.

In the shown example, the sterndrive is provided with an external oil circuit including an external oil filter 7. The oil filter is arranged inside the boat, preferably in the engine compartment close to the engine. By using an external oil circuit and by mounting the oil filter inside the boat, access to the oil filter is possible without having to open the sterndrive cover. An external oil circuit will also make it possible to change oil without lifting the boat out of the water. Preferably, oil and oil filter is changed at the same time, even though it is possible to change oil filters more often than the oil. The oil filter is connected to the oil reservoir of the sterndrive through oil conduits 8, and the oil of the sterndrive circulates through the oil conduits and the oil filter.

The control system of the boat controls the engine and the tilt and trim of the sterndrive. The engine may be provided with a dedicated engine control unit. The control system that checks the oil level may comprise a separate electronic control unit, or the control system may be integrated in an existing control unit of the boat control system. In the described example, the control unit is arranged to control the tilt function of the sterndrive and to read a signal from the oil level sensor of the sterndrive.

The sterndrive is provided with some sort of lubricant or oil level sensor 3. This sensor may e.g. be adapted to detect a minimum allowed oil level, or may be an oil quality sensor adapted to measure different parameters of the oil. This sensor is able to detect if the sensor extends into oil or not, but cannot measure the exact oil level. With this sensor, it is thus possible to detect when the oil level has reached the lowest allowed oil level, but it is not possible to determine the optimal oil level. A linear oil level sensor with a sufficient high resolution is costly.

Figure 2:
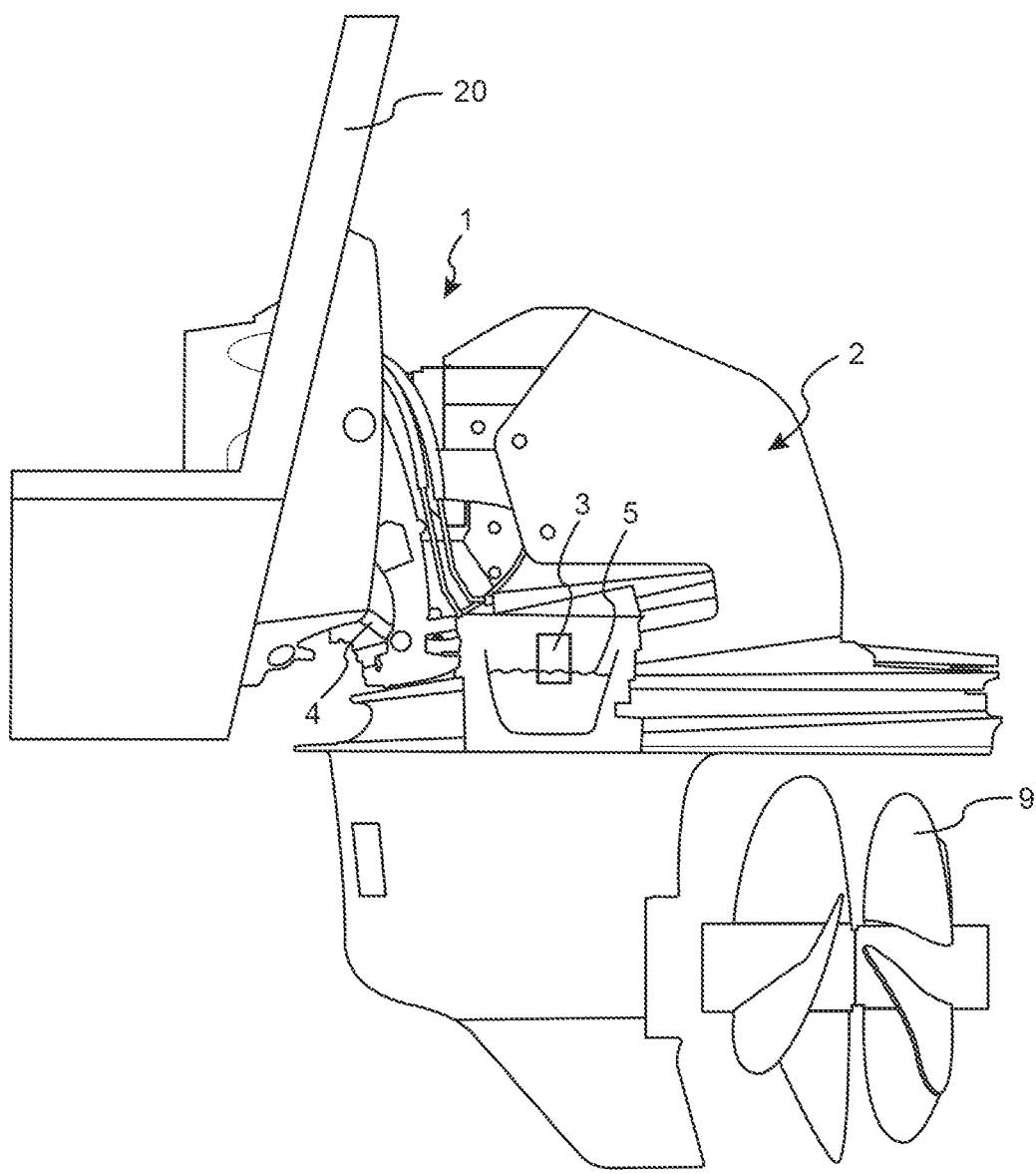
FIG. 2 shows a sterndrive in an untilted position.

When the oil is to be changed in the sterndrive, the oil filter is removed. The old oil in the sterndrive is drained, either by use of the existing oil pump or by an additional pump that drains the oil from the oil reservoir of the sterndrive. The sterndrive is preferably set to an untilted position, i.e. the tilt angle is zero degrees, when the oil is drained. This position is shown in FIG. 2. By removing the oil filter, the oil in the oil conduits will drain down into the oil reservoir. With all old oil drained from the oil reservoir, new oil is filled into the system. The installation in a given boat has a nominal amount of oil that should be filled, but since the tolerance of the amount of oil is relatively small, e.g. 0.3 dl for a total of 6 litres, it is of advantage to check the amount of oil when the system has been filled. When the nominal amount of oil is filled in the system, the new oil filter is mounted. The engine is started such that the oil in the oil system runs through the oil system and fills the oil filter and the conduits, and such that the oil system is bled. With the air removed from the oil system, the oil check method is performed.

A further advantage of checking that the correct oil is filled in the oil system is that different oil filters may hold different amounts of oil, which will also affect the oil level in the oil system.

Figure 3:
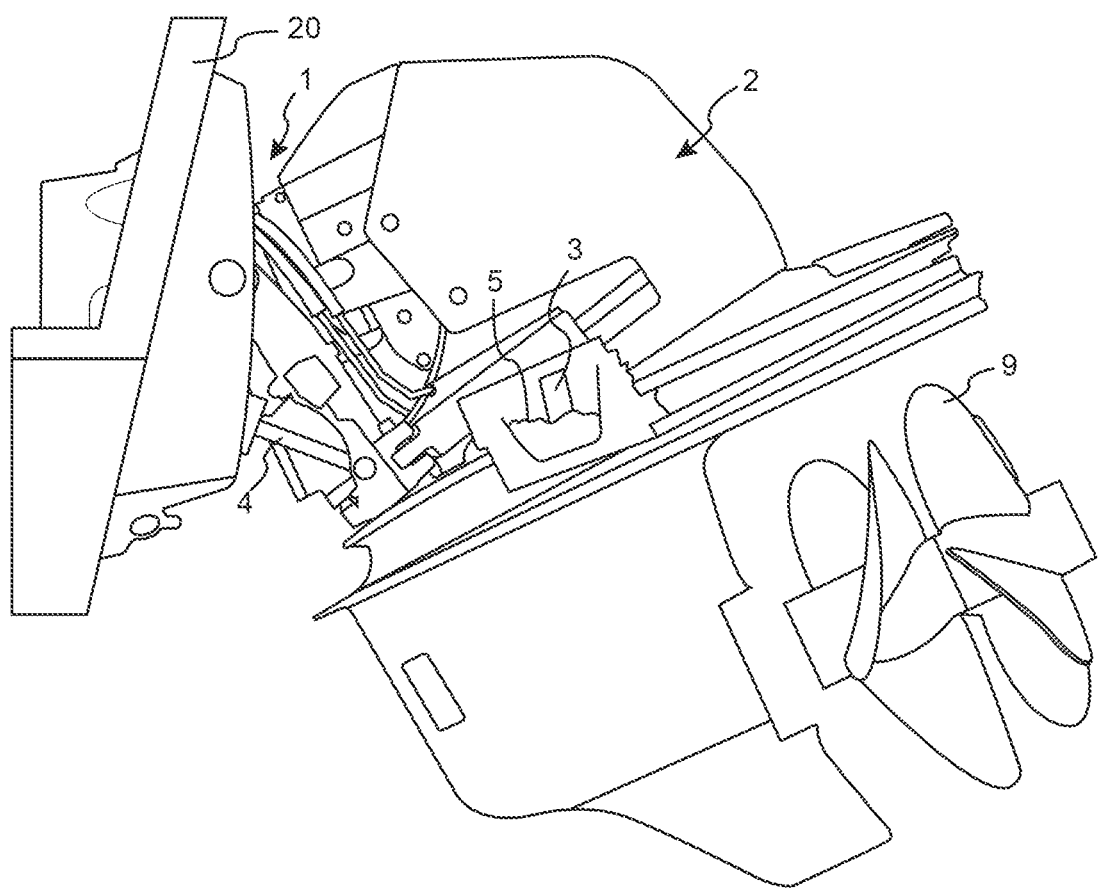
FIG. 3 shows a sterndrive in an intermediate tilt position.
Figure 4:
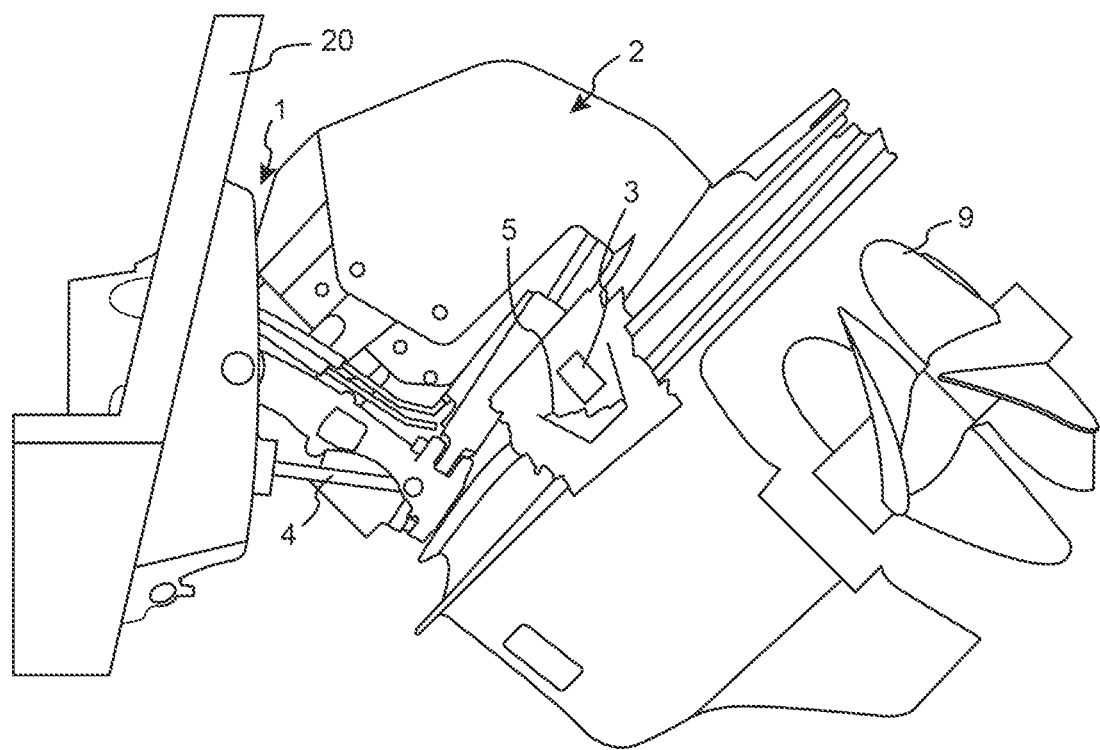
FIG. 4 shows a sterndrive in a maximal tilted position.

During the oil check method, the control system controls the tilt angle of the sterndrive and checks if the oil sensor detects any oil at that tilt angle. In one example, the control system sets the sterndrive unit at different tilt angles with a predefined interval, e.g. one degree or two degrees. At each tilt angle, the control unit reads a signal from the oil level sensor. Depending on the sensor, the signal level will be either high or low, or may have a small linear range in which the signal varies from one level to the other. For each tilt angle, the oil sensor signal value is read and saved in e.g. a table. FIG. 3 shows an example where the oil level sensor is about to leave the oil level. At this tilt angle, or in a previous or next tilt angle, the oil level sensor will detect that there is no oil, i.e. the oil level sensor changes its signal level. The control unit may allow a small idle time at each tilt angle, depending on e.g. the viscosity of the oil. When the last tilt angle is reached, e.g. the maximum tilt angle as shown in FIG. 4, the method is completed. It is also possible to e.g. stop the method when the reading from the sensor has changed from one signal level to the other.

The starting tilt angel is also possible to set. Depending on the actual installation, the oil level sensor may give a signal change at a tilt angle of e.g. 30 or 40 degrees. It may thus be efficient to start the method with a tilt angle of 20 or 30 degrees. It is also possible to stop the method when the signal from the oil level sensor has changed from one level to the other, or at a selected stop tilt angle.

Since the geometry of the sterndrive and thus of the oil reservoir is known, the correct oil level for the sterndrive can be determined for each sterndrive installation with external oil filter. In this way, the system can determine the amount of oil in the system depending on the detected tilt angle, at which the oil level sensor changes from one signal level to the other. It is thus possible to determine if the oil system contains the correct amount of oil, or if oil is to be drained or filled.

It is also possible for the control system to slowly and continuously tilt the sterndrive without stopping at predefined tilt angles. The control system will in this case read the tilt angle at predefined intervals and detect if the oil sensor gives a high or low signal. These readings are also stored in e.g. a table, and the correct amount of oil can be determined from the readings.

The method is preferably performed when an oil change has been made, in order to ensure that the system contains the correct amount of oil. Since the transmission of the sterndrive normally does not lose any oil in regular use, there is no reason to perform the method regularly, e.g. once a week or month. In an abnormal situation, the oil sensor will detect a too low oil level.

Figure 5:
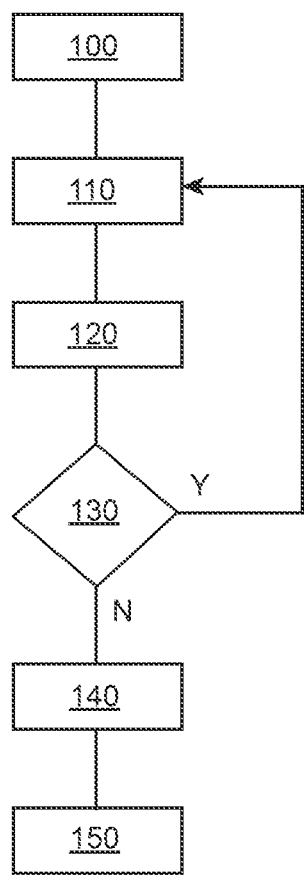
FIG. 5 shows a schematic flow chart of the inventive method.

FIG. 5 shows a schematic flow chart of one example of the method for checking the oil level in a marine drive unit of a boat. The method is performed when an oil change has been made.

In step 100, an oil level check is initiated. This may be made by a dedicated button, but is preferably made by selecting an appropriate field in a menu system provided in the existing control system of the boat. The tilt angle ta of the sterndrive is preferably set to zero when the oil is drained from the oil system. If not, the starting tilt angle $ta_{start}$ may be set to zero in the initializing step. The starting tilt angle may also be set to a desired start value $ta_{start}$, which may be either zero or a selected higher tilt angle value, e.g. 20 or 30 degrees, depending on the actual installation of the sterndrive. In this step, it is also possible to set a desired stop tilt angle $ta_{stop}$, if the stop tilt angle should differ from the maximal tilt angle $ta_{max}$ of the sterndrive.

In steps 110, the tilt means is controlled to tilt the sterndrive to a plurality of different tilt angle positions, one at the time. The sterndrive is tilted to a tilt angle and is stopped at this tilt angle for a predefined idle time period. This time period may depend on e.g. the viscosity of the oil. The purpose of the idle time period is to allow for the lubricant level sensor to stabilize its output signal.

In step 120, a signal from the oil level sensor is read and it is determined if the sensor detects an oil level in the sterndrive. For each tilt angle, the oil sensor signal is registered together with the tilt angle of the sterndrive.

In step 130, the actual tilt angle ta is compared to the selected stop tilt angle value $ta_{stop}$. When the stop tilt angle is reached, the method continues with step 140.

In step 140, it is determined at which tilt angle that the sensor detects an oil level. At this tilt angle, the signal from the sensor changes from one signal level to another, e.g. from a high reading to a low reading.

In step 150, it is determined if the oil level of the drive unit is within a predefined range. The total required oil amount for the oil system is known, and the geometry of the oil reservoir of the sterndrive is known, together with the installation parameters of the sterndrive and the boat. From these figures and the tilt angle from step 140, the amount of oil in the oil system can be determined. This determined amount of oil is compared to the predefined amount of oil for the system, and if the determined amount of oil is within the predefined oil range, the system provides a message that the oil level is within the specified range.

If the determined amount of oil is outside of the predefined oil range, it is determined if the determined amount of oil is smaller or larger than the predefined amount of oil. If the determined amount of oil is smaller than the predefined amount of oil, the difference is measured and a message is given stating the additional amount of oil that is to be added to the oil system. If the determined amount of oil is larger than the predefined amount of oil, the difference is measured and a message is given stating the amount of oil that is to be drained from the oil system.

When additional oil has been added to the oil system, or when excessive oil has been drained from the oil system, a new oil level check may be performed to ensure that the correct amount of oil was added or drained.

The invention is not to be regarded as being limited to the embodiments described above, a number of additional variants and modifications being possible within the scope of the subsequent patent claims.

REFERENCE SIGNS

1: Control system
2: Marine drive unit
3: Oil level sensor
4: Trim/tilt means
5: Oil level
6: Engine
7: Oil filter
8: Oil conduit
9: Propeller
10: Electronic control unit 11: Battery
20: Boat

The invention claimed is:

1. A computer controlled method for checking an oil level in a marine drive unit, where the drive unit is provided with an external oil filter, an oil level sensor adapted to determine an oil level in the drive unit, and an electronically controlled tilt means, comprising the following steps:
   receiving an initiation of a oil level check via a control system,
   sending a signal from the control system to the tilt means to control the tilt means to tilt the drive unit to a plurality of different tilt angle positions,
   for each tilt angle position, receiving a signal from the oil level sensor at the control system, the control system determining if the oil level sensor detects the oil level in the drive unit based on the received signal,
   for each tilt angle position, storing the tilt angle of the drive unit and its associated signal from the oil level sensor in an electronic memory,
   determining with the control system at which tilt angles the oil level sensor detects the oil level,
   in dependence of the determined tilt angle of the drive unit, determining, with the control system, if the oil level of the drive unit is within a predefined range.

2. Method according to claim 1, wherein the method further comprises the step of: if the oil level of the drive unit is outside the predefined range, determining if the oil level is above or below the predefined range.

3. Method according to claim 2, wherein the method further comprises the step of: if the oil level of the drive unit is below the predefined range, determining a missing amount of oil.

4. Method according to claim 2, wherein the method further comprises the step of: if the oil level of the drive unit is above the predefined range, determining an excess amount of oil.

5. Method according to claim 1, wherein in the step of controlling the tilt function of the drive unit, the drive unit is stopped at a plurality of discrete tilt angle positions.

6. Method according to claim 1, wherein in the step of controlling the tilt function of the drive unit, the drive unit is moved continuously at a low speed.

7. Method according to claim 1, wherein the tilt range of the drive unit for the oil level check can be preset to a desired tilt range, where the desired range is smaller than the maximal tilt range of the drive unit.

8. Method according to claim 1, wherein the oil level check is initiated when an oil change in the drive unit has been made.

9. Method according to claim 8, wherein the method further comprises the step of: running an engine powering the drive unit for a short time before the oil level check is initiated.

10. Method according to claim 1, wherein the drive unit is a sterndrive.

11. A non-transitory computer program product comprising program code stored on a computer readable medium for performing all the steps of claim 1 when said program code is run on a computer.

12. A control system for checking an oil level in a marine drive unit, where the drive unit is provided with an oil level sensor adapted to determine an oil level in an oil reservoir of the drive unit, an electronically controlled tilt means, and an electronic control unit, wherein the electronic control unit:
   receives an initiation of an oil level check,
   sends a signal to the tilt means to control the tilt means to tilt the drive unit to a plurality of different tilt angle positions,
   for each tilt angle position, receives a signal from the oil level sensor and determines if the oil level sensor detects the oil level in the drive unit based on the received signal,
   for each tilt angle position, stores the tilt angle of the drive unit and its associated signal from the oil level sensor in an electronic memory,
   determines at which tilt angles the oil level sensor detects the oil level, and
   in dependence of the determined tilt angle of the drive unit, determines if the oil level of the drive unit is within a predefined range.

13. Boat, comprising a control system according to claim 12.

14. Boat according to claim 13, wherein the boat is provided with an oil filter arranged outside of the drive unit.

* * * * *